United States Patent [19]

Lang

[11] Patent Number: 5,296,793
[45] Date of Patent: Mar. 22, 1994

[54] STATE OBSERVER FOR SYNCHRONOUS MOTORS

[75] Inventor: Jeffrey H. Lang, Waltham, Mass.

[73] Assignee: Massachusetts Institute of Technology, Cambridge, Mass.

[21] Appl. No.: 927,532

[22] Filed: Nov. 5, 1986

[51] Int. Cl.$^5$ .............................................. H02P 1/46
[52] U.S. Cl. .................... 318/715; 318/721; 318/809
[58] Field of Search ........ 318/800, 803, 805, 807-811, 318/715, 721, 719, 717, 716

[56] References Cited

U.S. PATENT DOCUMENTS

| | | | |
|---|---|---|---|
| 3,896,351 | 7/1975 | Blaschke | 318/717 |
| 4,388,577 | 6/1983 | Blaschke et al. | 318/808 |
| 4,423,367 | 12/1983 | Blaschke et al. | 318/805 |
| 4,442,393 | 4/1984 | Abbondanti | 318/802 |
| 4,511,978 | 4/1985 | Reng | 318/808 |
| 4,649,331 | 3/1987 | Jahns | 318/723 |
| 4,678,248 | 7/1987 | Depenbrock | 318/805 |

OTHER PUBLICATIONS

J. R. Frus et al., "Closed-Loop Control of Step Motors Without Feedback Control", Proceedings of the 5th Incremental Motion Control Systems and Devices Symposium, CC/1-CC/11, Urbana, Ill., 1976.
A. Pittet et al., "Closed-Loop Control Without Encoder of Electromagnetic Step Motors", Proceedings of the 7th Incremental Motion Control Systems and Devices Symposium, 37-44, Urbana, Ill., 1978.
P. P. Acarnley et al., "Detection of Rotor Position in Stepping and Switched Motors by Monitoring of Current Waveforms", IEEE Transactions on Industrial Electronics, 32, 215-222, 1985.
W. C. Lin et al., "Waveform Detection of Permanent Magnet Motors: Parts I and II", Proceedings of the 8th Incremental Motion Control Systems and Devices Symposium, 227-256, Urbana, Ill., 1979.
B. C. Kuo et al., "Close Loop Control of a 3.6° Floppy Disk Drive pm Motor by Back emf Sensing", Proceedings of the 11th Incremental Motion Control Systems and Devices Symposium, Urbana, Ill., 1983.
T. Higuchi, "Closed Loop Control of pm Step Motors by Back emf Sensing", Proceedings of the 11th Incremental Motion Control Systems and Devices Symposium, Urbana, Ill., 1982.
V. D. Hair, "Direct Detection of Back emf in Permanent-Magnet Step Motors", Proceedings of the 12th Incremental Motion Control Systems and Devices Symposium, 211-219, Urbana, Ill., 1983.
D. G. Luenberger, "An Introduction to Observers", IEEE Transactions on Automatic Control, 16, 596-602, 1971.
D. G. Luenberger, Introduction to Dynamic Systems, John Wiley, 1979.
F. E. Thau, "Observing the State of Nonlinear Dynamic Systems", International Journal of Control, 17, 471-479, 1973.
S. R. Kou et al., "Exponential Observers for Nonlinear Dynamic Systems", Information and Control, 29, 204-216, 1975.
D. Bestle et al., "Canonical Form Observer for Nonlinear Time-Variable Systems", International Journal of Control, 38, 419-431, 1983.
A. J. Krener et al., "Nonlinear Observers with Linearizable Error Dynamics", Siam Journal of Control and

(List continued on next page.)

Primary Examiner—William M. Shoop, Jr.
Assistant Examiner—John W. Cabeca
Attorney, Agent, or Firm—Choate, Hall & Stewart

[57] ABSTRACT

A state observer driven by measurements of phase voltages and currents for estimating the angular orientation of a rotor of a synchronous motor such as a variable reluctance motor (VRM). Phase voltages and currents are detected and serve as inputs to a state observer. The state observer includes a mathematical model of the electromechanical operation of the synchronous motor. The characteristics of the state observer are selected so that the observer estimates converge to the actual rotor angular orientation and velocity, winding phase flux linkages or currents.

12 Claims, 5 Drawing Sheets

OTHER PUBLICATIONS

Optimization, 23, 197–216, 1985.

A. Bellini et al., "Realization of a Bilinear Observer of the Induction Machine", Proceedings of the Second International Conference on Electrical Variable Speed Drives, 175–178, London, 1979.

Y. Dote, "Stabilization of Controlled Current Induction Motor Drive System Via New Nonlinear State Observer", IEEE Transactions on Industrial Electronics and Control Instrumentation, 27, 77–81, 1980.

G. C. Verghese et al., "Observers for Faster Flux Estimation in Induction Machines", Proceedings of the IEEE Power Electronics Specialists Conference, Toulouse, 1985.

H. Kwakernaak et al., Linear Optimal Control Systems, John Wiley, 1972.

H. H. Woodson et al., Electromechanical Dynamics, vol. 1, John Wiley and Sons, 1968.

R. W. Brocket, Finite Dimensional Linear Systems, John Wiley and Sons, 1970.

A. Lumsdaine et al., "Control of a Variable Reluctance Motor Based on State Observation", S. M. Thesis, Massachusetts Institute of Technology, Cambridge, Mass., Nov. 1985.

"A State Observer for Variable Reluctance Motors: Analysis and Experiments", A. Lumsdaine et al., 19th Asilomar Conference on Circuits, Systems Computers, Nov. 6–8, 1985, Pacific Grove, Calif.

"A State Observer for Variable Reluctance Motors", A. Lumsdaine et al., Incremental Motion Control Systems Symposium, Champaign, Ill., Jun. 3–5, 1986.

STATE OBSERVER FOR SYNCHRONOUS MOTORS

The Government of the United States has rights in this application pursuant to DOE Contract No. DE-AC08-CS-50101 with the Aerospace Corporation and subcontract No. W-0399NV with the Massachusetts Institute of Technology.

BACKGROUND OF THE INVENTION

This invention relates to the control of synchronous motors and more particularly to a state observer for estimating the angular orientation of the rotor of a synchronous motor such as a variable reluctance motor.

To obtain high performance from a synchronous motor such as a variable reluctance motor, its phases must be excited in synchronism with the position of its rotor. A shaft encoder or resolver typically provides the rotor position information necessary for this closed loop excitation. In some applications, the sensors are undesirable for reasons of cost, size, weight or reliability.

It is also known to infer rotor position by means of estimators for variable reluctance motors and permanent magnet motors driven by measurements of phase voltages and currents. These estimators primarily use zero crossing and peak detection to confirm coarse rotor motion rather than provide continuous position estimation. References [1-8] set forth in the accompanying Appendix report such position estimators. (Numbers in brackets refer to the references set forth in the Appendix.)

Observer theory is well developed for linear systems [9,10] and partially developed for non-linear systems [11-14]. However, the use of observers with electrical motors is rare despite the advantages they offer. Notable exceptions are concerned with the estimation of rotor flux in induction motors [15-17].

It is therefore an object of the present invention to provide an alternative to direct rotor position measurement for the control of synchronous motors.

Yet another object of the invention is an observer driven by measurements of phase voltages and currents for estimating rotor position continuously.

Still another object of the invention is a state observer able to determine rotor position to within one part in 50,000 of a mechanical cycle.

A still further object of the invention is such an observer which can be implemented with an ordinary motor controller forming a paint of synchronous motor systems.

SUMMARY OF THE INVENTION

These and other objects of the invention are achieved with a state observer having computing apparatus responsive to motor phase voltages and currents. The observer has stable dynamics so that the estimate of rotor position converges with actual rotor position. The stable observer is designed utilizing state equations of motor dynamics. An observer particularly adapted for use with a variable reluctance synchronous motor has the form $$\tilde{\lambda}' = -RH(\tilde{\theta})\tilde{\lambda} + v + F_\lambda(\tilde{\theta},\tilde{\lambda})(\tilde{i}-i)$$

$$\tilde{\omega}' = F_\omega(\tilde{\theta},\tilde{\lambda})(\tilde{i}-i)$$

$$\tilde{\theta}' = \tilde{\omega} + F_\theta(\tilde{\theta},\tilde{\lambda})(\tilde{i}-i)$$

$$\tilde{i} = H(\tilde{\theta})\tilde{\lambda}$$

In these equations, $F_\lambda$, $F_\omega$, and $F_\theta$, are selected so that the observer is stable.

BRIEF DESCRIPTION OF THE DRAWING

The invention disclosed herein will be understood better with reference to the drawing of which.

DESCRIPTION OF THE PREFERRED EMBODIMENT

Figure 1:
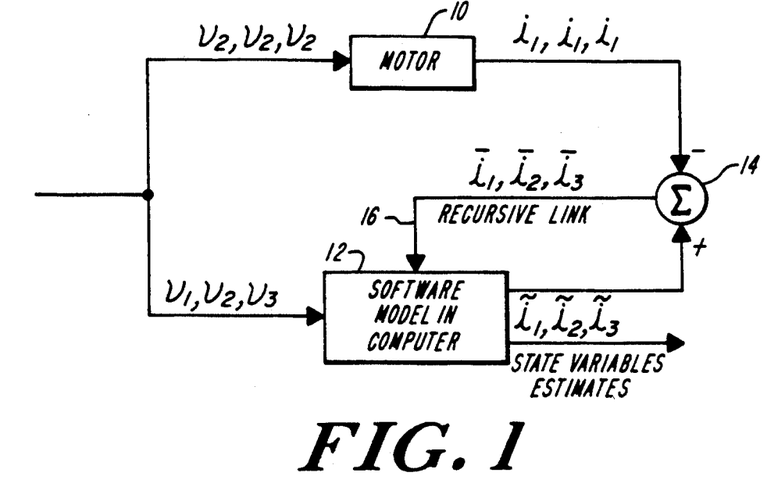
FIG. 1 is a schematic illustration of observer theory utilized in the present invention.

The present invention utilizes observer theory for estimating the angular orientation of the rotor of a synchronous motor such as a variable reluctance motor. FIG. 1 illustrates the general concept of an observer. In FIG. 1, a synchronous motor such as a variable reluctance motor 10 has as inputs the three voltages $v_1$, $v_2$, and $v_3$ and as outputs, the currents $i_1$, $i_2$, and $i_3$. A computer (not shown) includes a software model 12 of the dynamics of the motor 10, a recursive link 16 and a comparison subtractor 14. The actual currents $i_1$, $i_2$, and $i_3$ are compared with current estimates and $\tilde{i}_1$, $\tilde{i}_2$, and $\tilde{i}_3$ at a summing junction 14. The difference between the actual and estimated currents, $\tilde{i}_1$, $\tilde{i}_2$, and $\tilde{i}_3$ are fed into the software model via a recursive link 16 thereby creating a state observer. As will be discussed hereinbelow, the characteristics of such an observer can be made stable so that the estimates of state variables such as angular orientation and angular velocity of the rotor converge to the actual values. The estimates can thus be used for synchronous excitation of the phases for motor operation.

Figure 2:
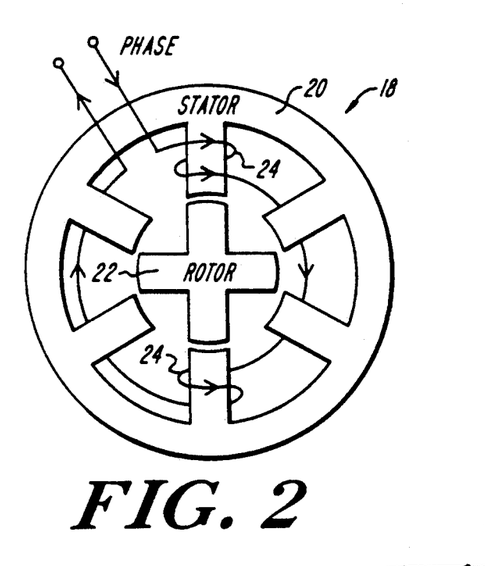
FIG. 2 is a cross-sectional view of a typical three-phase variable reluctance motor.

The present invention is applicable to synchronous motors in general such as permanent magnet synchronous motors and variable reluctance synchronous motors. The invention will be illustrated in conjunction with variable reluctance motors as representative of synchonrous motors in general. Variable reluctance motors are found in applications which range from incremental position actuation to traction. Such applications include pumps, fans and compressors, and stepping motors. Synchronous motors are also often used in robotics. FIG. 2 shows the cross-section of a typical three-phase variable reluctance motor (VRM) 18 which illustrates the essential characteristics of any VRM. The motor 18 includes steel stator laminations 20 and steel rotor laminations 22. The stator 20 includes copper phase windings 24. Each phase is wound with alternating magnetic polarity on symmetrically located stator poles. Because of the symmetry of the phases, there is negligible mutual inductance between them. The excitation of a phase magnetizes both the stator and the rotor. This magnetization produces a torque causing the rotor to align its poles with those excited on the stator. Since the torque is attractive, it is independent of the sign of the phase current. Sequential phase excitation causes rotor motion which synchronously aligns the rotor poles with those excited on the stator. To obtain high performance from a VRM, its phases must be excited in synchronism with the position of its rotor. Thus, rotor position with respect to the stator must be known for motor control. The present invention determines rotor orientation without direct measurement thus eliminating shaft encoders or resolvers which typically provide the rotor position information necessary for closed loop excitation. As will be described in detail below, angular position and velocity are estimated by a stable observer driven by measurements of phase voltages and currents.

A brief review of observer theory will now be given as an aid to a fuller understanding of the present invention. As illustrated above in conjunction with FIG. 1, an observer for a linear system takes the form of a simulation which is dynamically corrected according to errors between the simulated and measured outputs of the system. The states of the observer become the estimates of the states of the system. To illustrate, consider the linear system of $$x' = A\,x = B\,u \tag{1}$$

$$y = C\,x \tag{2}$$

where u is the known input vector, x is the state vector, y is the measured output vector, A, B, and C are coefficient matrices and ' denotes temporal differentiation. An observer for this system is $$\tilde{x}' = A\,\tilde{x} + B\,u + F(C\,\tilde{x} - y) \tag{3}$$

where $\sim$ denotes an estimate. The last term in equation (3) is the difference between the simulated and measured outputs of the observed system multiplied by the observer gain matrix F.

To evaluate the performance of the observer, its error dynamics are considered. The observer error is defined by $$\overline{x} = \tilde{x} - x. \tag{4}$$

Substitution of (1-3) into the temporal derivative of (4) yields $$\overline{x}' = (A + F\,C)\overline{x}. \tag{5}$$

The initial condition for (5) is the initial estimation error. If F is chosen so that $(A+FC)$ is a stable matrix, then $\overline{x}$ decays to zero as time proceeds, and $\tilde{x}$ converges to x. The rate of convergence is governed by the stability of $(A+FC)$. If $(A+FC)$ is time invariant, then it is stable if and only if its eignevalues all have negative real parts, and these eignevalues determine the rate of convergence of the observer. This suggests that arbitrarily fast convergence can be obtained by the proper selection of F. While this is true in theory if certain observability criteria are met [9,10], strong feedback through F also amplifies the measurement disturbances which will certainly be present in y. Therefore, a compromise is usually made during the selection of F. One such compromise results in the Kalman Filter which selects F to yield the minimum mean square state estimation error in the presence of a specific noise model [18].

In order to build an observer, a mathematical model of the system to be observed must be made. The essential electromechanical operation of a magnetically linear VRM can be modelled by $$\lambda_n' = -R_n H_n(\theta)\lambda_n + \nu_n \tag{6}$$

$$\omega' = -\frac{D}{J}\omega - \frac{1}{2J}\sum_n \frac{dH_n(\theta)}{d\theta}\lambda_n^2 \tag{7}$$

$$\theta' = \omega \tag{8}$$

$$i_n = H_n(\theta)\lambda_n. \tag{9}$$

Here, $\lambda_n$, $\nu_n$, $i_n$, $R_n$, and $H_n$ are the flux linkage, voltage, current, resistance and reciprocal inductance of phase n, respectively, and $\omega$, $\theta$, D and J are the velocity, position, damping and inertia of the rotor, respectively [19]. Magnetic saturation and hysteresis are omitted in (6,7,9).

Let the VRM have N phases and M rotor poles. Then, $H_n$ is periodic in rotations of $\theta = 2\pi/M$ and the individual reciprocal inductances are related to each other according to $$H_n(\theta) = H_1\left(\theta - \frac{2\pi(n-1)}{N}\right) \tag{10}$$

where the numbering of the phases varies according to the details of VRM construction. For convenience, two rotational cycles are defined. The angular rotation of $\theta = 2\pi$ is termed a mechanical cycle while the angular rotation of $\theta = 2\pi/M$ is termed an electrical cycle.

The model of (6-9) is condensed using $$\lambda = [\lambda_1 \ldots \lambda_N]^* \tag{11}$$

$$i = [i_1 \ldots i_N]^* \tag{12}$$

$$\nu = [\nu_1 \ldots \nu_N]^* \tag{13}$$

$$R = \text{Diagonal}\,[R_1 \ldots R_N] \tag{14}$$

$$H(\theta) = \text{Diagonal}\,[H_1(\theta) \ldots H_N(\theta)] \tag{15}$$

where * denotes algebraic transposition. Further, for simplicity, the case of infinite rotor inertia, $J \to \infty$, is considered. Using (11-15), (6-9) become $$\lambda' = -RH(\theta)\lambda + \nu \tag{16}$$

$$\omega' = 0 \tag{17}$$

$$\theta' = \omega \tag{18}$$

$$i = H(\theta)\lambda \tag{19}$$

as $J \to \infty$. The assumption of an infinite rotor inertia reduces the VRM to constant velocity operation, as shown in (17). This assumption is of practical importance since an observer can often be designed to converge much faster than VRM velocity can respond to torques.

In the preceding VRM model, $v$ is the known input, $i$ is the measured output, and $\lambda$, $\omega$ and $\theta$ are the states. In order to estimate the states, an observer of the form $$\tilde{\lambda}' = -RH(\tilde{\theta})\tilde{\lambda} + v + F_\lambda(\tilde{\theta},\tilde{\lambda})(\tilde{i}-i) \quad (20)$$

$$\tilde{\omega}' = F_\omega(\tilde{\theta},\tilde{\lambda})(\tilde{i}-i) \quad (21)$$

$$\tilde{\theta}' = \tilde{\omega} + F_\theta(\tilde{\theta},\tilde{\lambda})(\tilde{i}-i) \quad (22)$$

$$\tilde{i} = H(\tilde{\theta})\tilde{\lambda} \quad (23)$$

is developed. Following the theme of (5), this observer combines the VRM model of (16-19) with the additional dynamic correction terms present in (20-22). The correction terms are comparisons of the estimated and measured outputs multiplied by gains which depend on $\tilde{\theta}$ and $\tilde{\lambda}$ to reflect the principal nonlinearities of the VRM. This observer is similar in form to several of those considered in [11-12].

Consider the observer error dynamics. Define the observer errors according to $$\bar{\lambda} = \tilde{\lambda} - \lambda \quad (24)$$

$$\bar{\omega} = \tilde{\omega} - \omega \quad (25)$$

$$\bar{\theta} = \tilde{\theta} - \theta \quad (26)$$

$$\bar{i} = \tilde{i} - i \quad (27)$$

It is important to realize that an observer, as well as a shaft encoder or resolver, can not distinguish one basic cycle from another without the aid of an external marker. Consequently, the preceding errors are defined modulo an electrical cycle. Substitution of (16-23) and (27) into the temporal derivatives of (24-26) yields $$\bar{\lambda}' = R(H(\theta)\lambda - H(\tilde{\theta})\tilde{\lambda}) + F_\lambda(\tilde{\theta},\tilde{\lambda})\bar{i} \quad (28)$$

$$\bar{\omega}' = F_\omega(\tilde{\theta},\tilde{\lambda})\bar{i} \quad (29)$$

$$\bar{\theta}' = \bar{\omega} + F_\theta(\tilde{\theta},\tilde{\lambda})\bar{i} \quad (30)$$

as the observer error dynamics.

To complete the observer, it is necessary to select $F_\lambda$, $F_\omega$ and $F_\theta$ so that (28-30) are stable. To do so, a simple observer is considered in which $$F_\lambda(\tilde{\theta},\tilde{\lambda}) = R. \quad (31)$$

Figure 3:
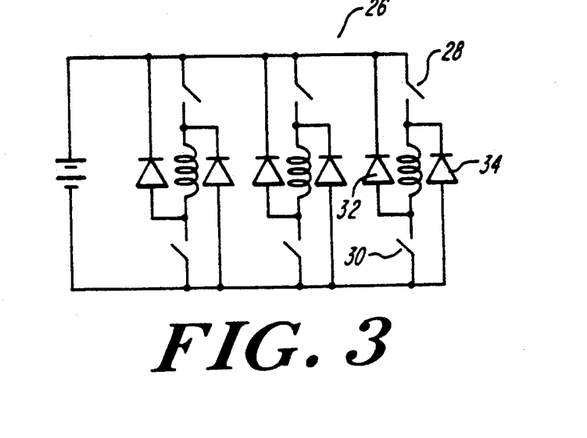
FIG. 3 is a schematic diagram of a typical variable reluctance motor inverter.

In this case, (20) and (28) become $$\tilde{\lambda}' = -R\,i + v \quad (32)$$

$$\bar{\lambda}' = 0 \quad (33)$$

respectively. From (33), it is apparent that the observer of (20-23) with (31) is only a simulator of flux linkage. That is, (16) is simulated without dynamic correction. This is also evident by comparing (16) with (32). This form of observer is often justified by the operation of the VRM and its inverter. Since the torque produced by a VRM is independent of the sign of its currents, a simple unipolar inverter is often used to excite a VRM. A typical inverter 26 for the VRM of FIG. 2 is shown in FIG. 3. When a switch pair such as the pair 28, 30 closes, the power supply is connected to the corresponding phase so as to increase the current in that phase. When the switch pair opens, the power supply is reconnected to the phase through a diode pair 32, 34 so as to decrease the current. If the current then reaches zero, the diode pair opens and the current remains zero until the switch pair closes again. Consequently VRM currents are always nonnegative, and driven to zero for a nonzero duration once per electrical cycle to avoid counterproductive torque. In this case, the inverter maintains the current and hence flux at exactly zero until the next electrical cycle. Consequently, (32) can be integrated from the exact initial condition of $\tilde{\lambda} = 0$ when the inverter switches are closed. Thus, in the absence of disturbances and modelling errors, $\bar{\lambda} = 0$.

The gains $F_\omega$ and $F_\theta$ must still be determined so that (29-30) are stable. To facilitate this, (29-30) are linearized about zero observer error with $\bar{\lambda} = 0$ to yield $$\begin{bmatrix} \bar{\theta} \\ \bar{\omega} \end{bmatrix}' = \begin{bmatrix} F_\theta(\theta,\lambda) \frac{dH(\theta)}{d\theta} \lambda & 1 \\ F_\omega(\theta,\lambda) \frac{dH(\theta)}{d\theta} \lambda & 0 \end{bmatrix} \begin{bmatrix} \bar{\theta} \\ \bar{\omega} \end{bmatrix} \quad (34)$$

$$= A(\theta,\lambda)\,[\bar{\theta}\bar{\omega}]^*.$$

The stability of (34) guarantees the stability of the observer error in a neighborhood of the origin. The dynamics of (34) are periodic due to (17-18), the periodicity of $H$, and the further assumption that the VRM is excited by a periodic control law. Therefore, a stable (34) is exponentially stable because a Floquet transformation can be found which makes it time invariant [9,20].

Since (34) is exponentially stable in a neighborhood of the origin when it is stable, the omission in (21) of the torque terms from (7) will lead to bounded $\bar{\omega}$ and $\bar{\theta}$ for sufficiently large $J$ or small torques. Similarly, sufficiently small errors encountered in the simulation of $\lambda$ using (32) will lead only to bounded $\bar{\omega}$ and $\bar{\theta}$.

One set of stabilizing $F_\omega$ and $F_\theta$ is $$F_\omega(\theta,\lambda) = -G_\omega \frac{\left(\frac{dH(\theta)}{d\theta} \lambda\right)^*}{\left|\frac{dH(\theta)}{d\theta} \lambda\right|^2} \quad (35)$$

$$F_\theta(\theta,\lambda) = -G_\theta \frac{\left(\frac{dH(\theta)}{d\theta} \lambda\right)^*}{\left|\frac{dH(\theta)}{d\theta} \lambda\right|^2} \quad (36)$$

where $G_\theta$ and $G_\omega$ are positive constants. For these gains, the state matrix of (34) is constant and exponentially stable provided that $(dH/d\theta)\lambda$ never vanishes. That $(dH/d\theta)\lambda$ must never vanish places an operating constraint on $\lambda$ which is almost certainly met.

Unfortunately, the gains of (35-36) can exhibit very small denominators in practice which amplifies disturbances and modelling errors. While they do work, their experimental performance is poor, and an alternative is sought. A suitable alternative replaces the denominators in (35-36) by unity, and, for additional simplicity, $\lambda^*$ by $[1 \cdots 1]$. Then, $$F_\omega(\theta,\lambda) = - G_\omega[1 \ldots 1]\frac{dH(\theta)^*}{d\theta} \quad (37)$$

$$F_\theta(\theta,\lambda) = - G_\theta[1 \ldots 1]\frac{dH(\theta)^*}{d\theta} \quad (38)$$

To guarantee the stability of (34) with (37–38), consider the Lyapunov function V where $$V = \overline{[\theta\omega]}Q(\theta,\lambda)\overline{[\theta\omega]}^* \quad (39)$$

$$Q(\theta,\lambda)A(\theta,\lambda) + A(\theta,\lambda)^* Q(\theta,\lambda) = -I \quad (40)$$

and I is the identity matrix. With positive $G_\omega$ and $G_\theta$ in (37–38), A in (34) has eigenvalues with negative real parts. Therefore, the time varying solution Q to (40) is always symmetric and positive definite. Finally, substitution of (40) into the temporal derivative of (39) yields $$V' = -(\overline{\theta^2 + \omega^2}) + [\overline{\theta^2 \omega^2}]Q'(\theta,\lambda)[\overline{\theta^2 \omega^2}]^* \quad (41)$$

which is negative definite if $G_\omega$ and $G_\theta$ are sufficiently large so that Q' has less than unity magnitude. In this case, (34) is stable [20]. To determine sufficient conditions for stability, solve (40) with (34) and (37–38) for Q, take the magnitude of its temporal derivative, and bound this magnitude by unity. This results in $$G_\omega > \left| \frac{2G}{(1-G)S(\theta,\lambda)} \right| \quad (42)$$

$$G_\theta > \left| \frac{S'(\theta,\lambda)}{2G S^2(\theta,\lambda)} \right| \quad (43)$$

$$S(\theta,\lambda) = [1 \ldots 1]\frac{dH(\theta)^*}{d\theta}\frac{dH(\theta)}{d\theta}\lambda > 0 \quad (44)$$

$$0 < G < 1. \quad (45)$$

Here, G is an arbitrary constant subject to (45) which trades off the inequalities which bound $G_\omega$ and $G_\theta$. From (42–43), the lower bound on $G_\theta$ is proportional to $\omega$ while the lower bound on $G_\omega$ is independent of $\omega$. Thus, the lower bounds can be satisfied even at $\omega = \theta$. Both lower bounds are inversely proportional to the amplitude of $\lambda$ indicating that the VRM must be excited for the observer to function.

Experiment results are now provided to illustrate the operation of the observer of (20–23) which uses (31) and (37–38). For these experiments, a VRM with N=3, M=141, R=2.40 $\Omega$, B=0.126 kg-m²/s and J=9.78 kg-m² is used. The large J is obtained by adding extra inertia to the rotor. The reciprocal inductance $H_1$ is well modelled by $$H_1(\theta) = \sum_{m=0}^{3} H^{(m)} \cos(m M \theta) \quad (46)$$

where the reciprocal inductance coefficients $H^{(0)}$ through $H^{(3)}$ are 7.855, −2.980, 0.396 and 0.042 Henries$^{-1}$, respectively. The inverter power supply is 12.4 V. The control law for all experiments switches a phase on/off when the VRM reaches a position of minimum-/maximum inductance for that phase. In response, the VRM rotates with $\omega$1.62 rad/s. Finally, the VRM is fitted with a highly accurate shaft resolver from which $\theta$ and $\dot\theta$ can be measured to assess the performance of the observer disclosed herein.

FIGS. 4–11 present the results of various experiments. In each figure, all positions and velocities are presented in electrical cycle units as opposed to the mechanical cycle units used elsewhere. Thus, these figures present positions and velocities multiplied by M, which is 141.

Figure 4:
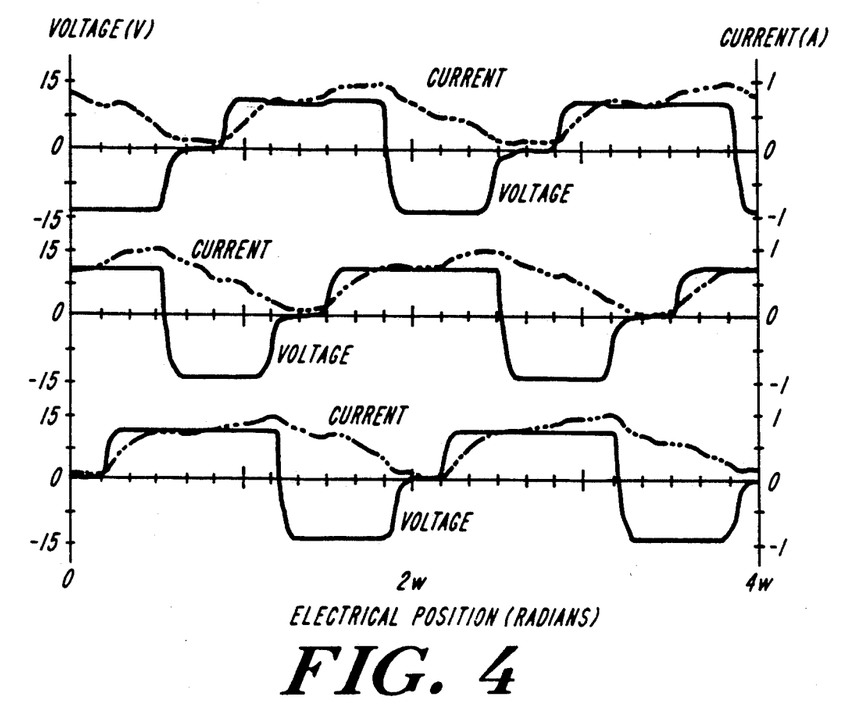
FIG. 4 is a graph of experimental voltages and currents generated by a variable reluctance motor.
Figure 5:
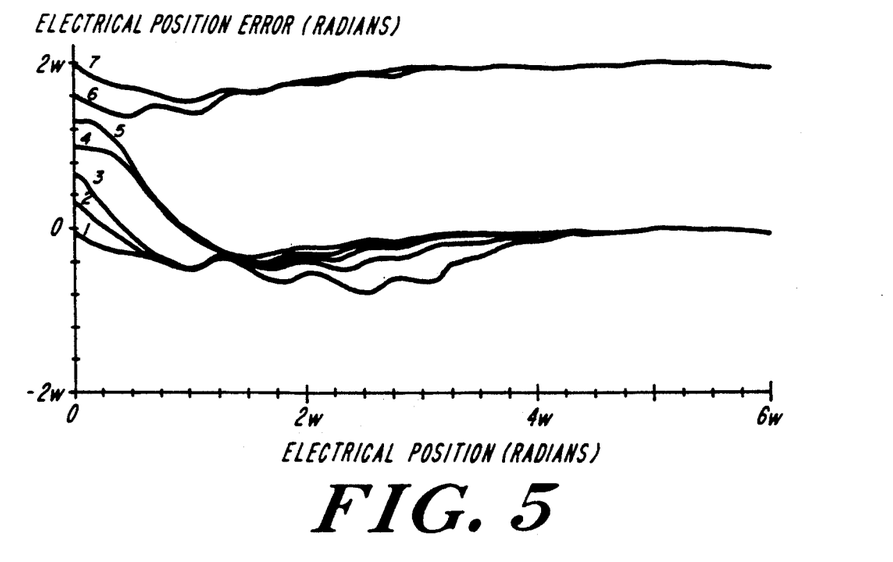
FIG. 5 is a graph of electrical position errors versus electrical position using the observer disclosed herein.
Figure 6:
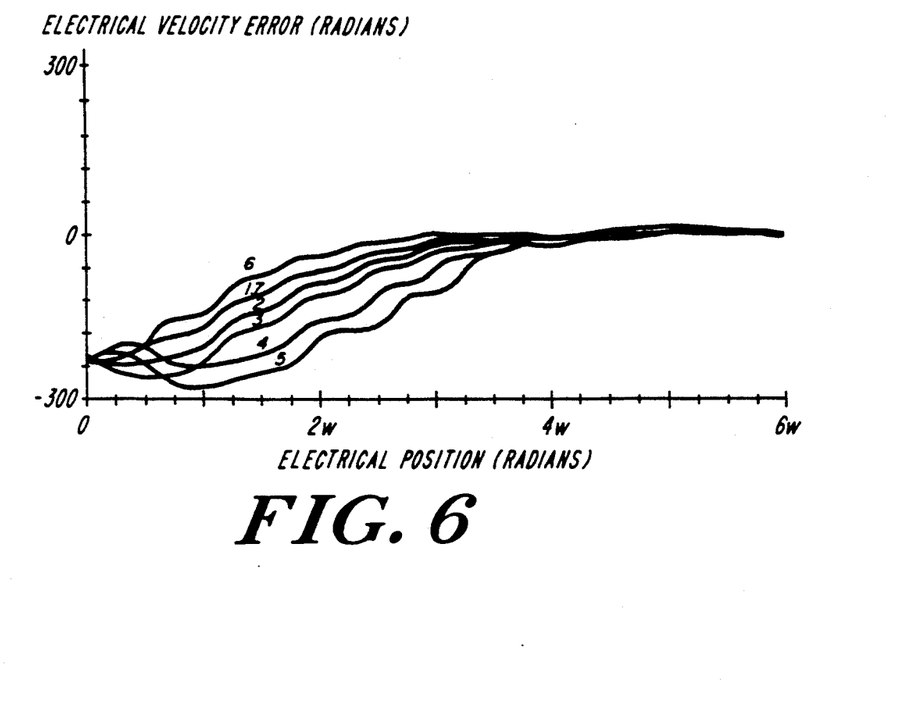
FIG. 6 is a graph of electrical velocity error versus electrical position.
Figure 7:
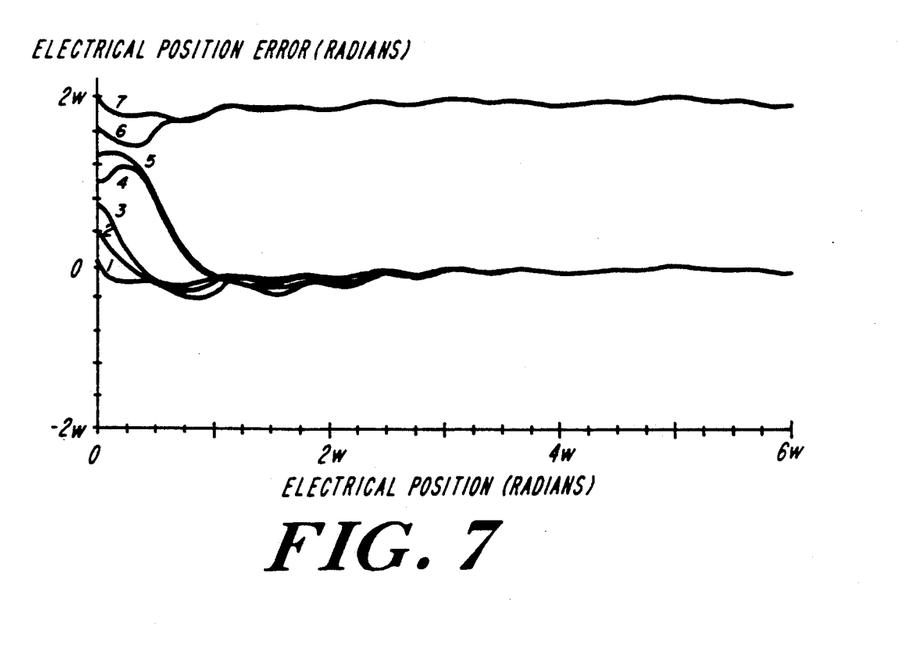
FIG. 7 is a graph of electrical position error versus electrical position.
Figure 8:
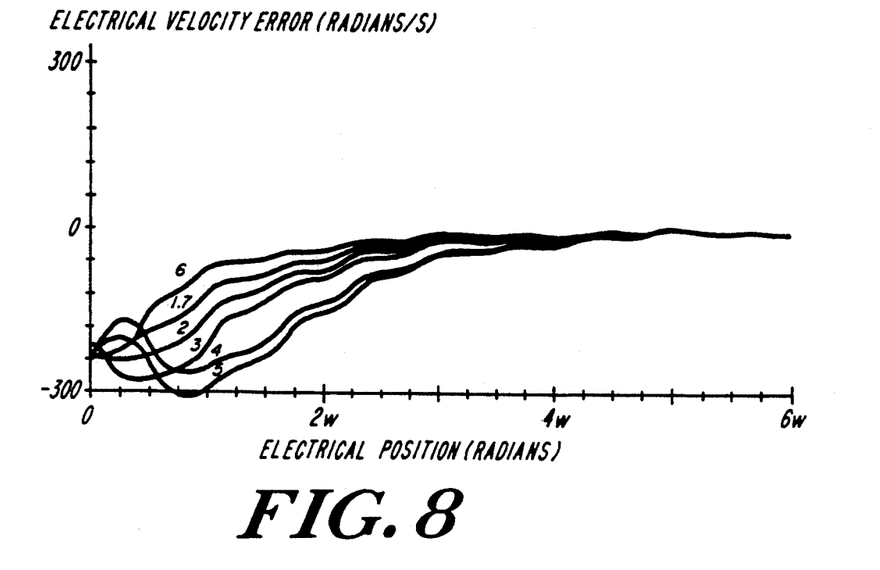
FIG. 8 is a graph of electrical velocity error versus electrical position.
Figure 9:
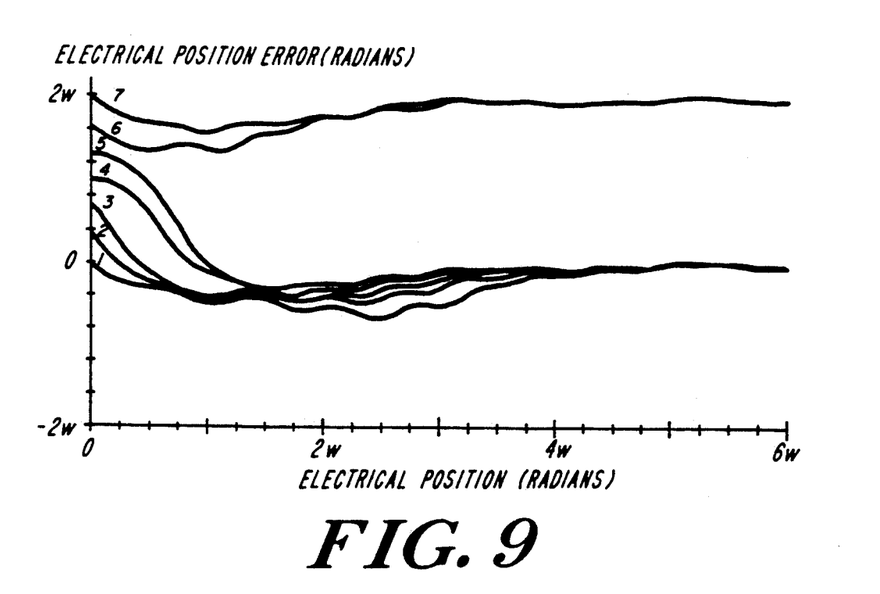
FIG. 9 is a graph of electrical position error versus electrical position.
Figure 10:
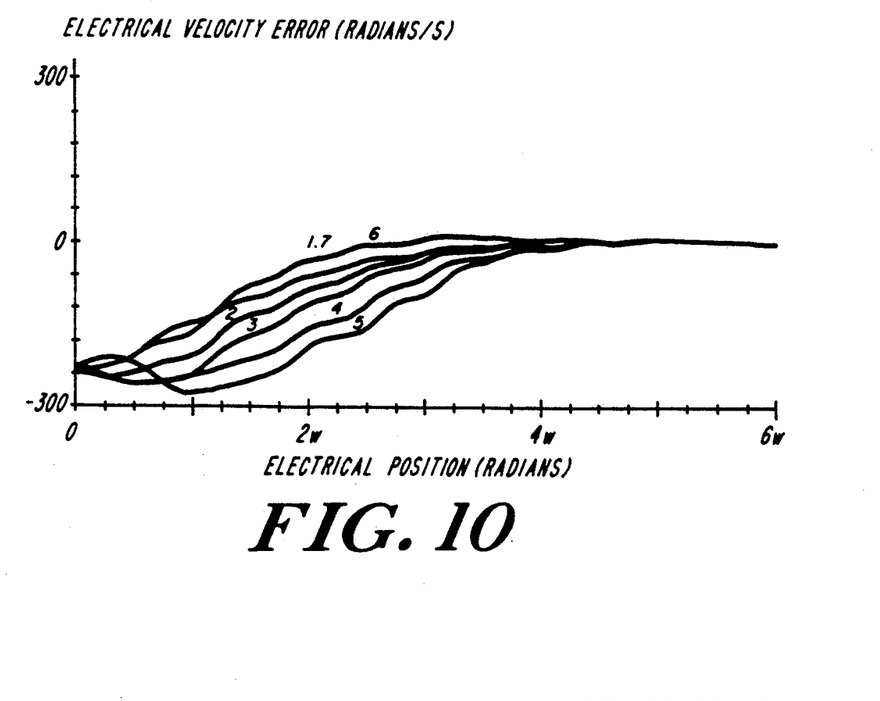
FIG. 10 is a graph of electrical velocity error versus electrical position.

The control law initially obtains VRM position from the resolver. Voltages and currents are recorded and processed offline by the observer. FIG. 4 shows one set of experimental voltages and currents. FIGS. 5 and 6 respectively show $\overline{\theta}$ and $\overline{\omega}$ for $G_\theta = 0.00880$ Henry-rad²/A-s and $G_\omega = 0.402$ Henry-rad²/A-s². FIGS. 7 and 8 respectively show $\overline{\theta}$ and $\overline{\omega}$ for $G_\theta = 0.0166$ Henry-rad²/A-s and $G_\omega = 0.830$ Henry-rad²/A-s². In each experiment, the initial $\overline{\theta}$ is a parameter, and the initial $\overline{\omega}$ is zero. To illustrate the effects of modelling error, and to illustrate the operation of a computationally simple observer, (46) is simplified in the observer to include only a constant and a first harmonic. With the gains corresponding to FIGS. 5 and 6, the results of FIGS. 9 and 10 are achieved. Small but noticable estimation errors are Liresent in the figures, and the periodicity of these errors indicates that they are driven by modelling errors.

Figure 11:
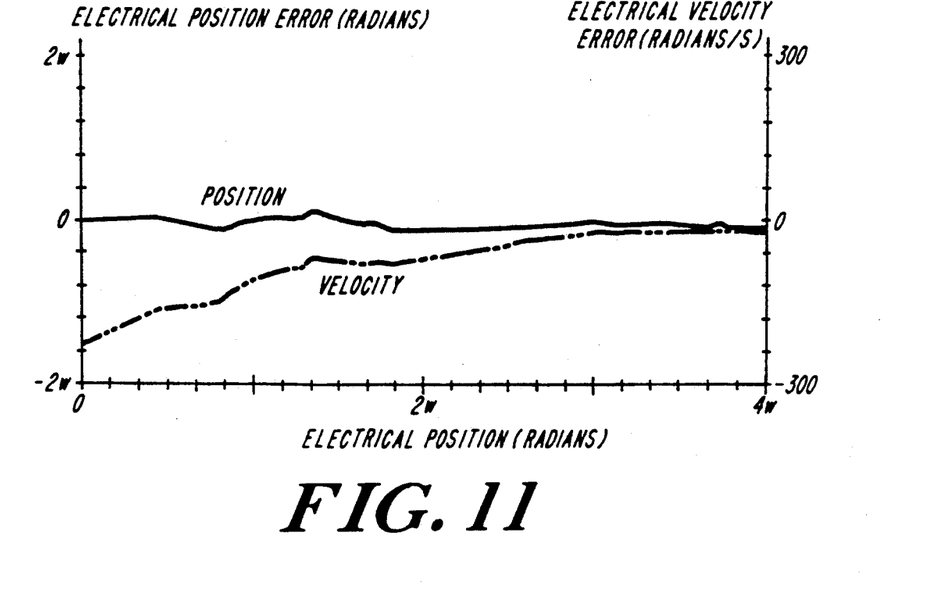
FIG. 11 is a graph of electrical position error and electrical velocity error versus electrical position.

Finally, the observer of FIGS. 5 and 6 is operated in real time providing the position information for the control law. In these experiments, $H^{(0)}$ through $H^{(3)}$ are inadvertently set to 14.7, −9.81, 3.76 and −2.09 Henries$^{-1}$, thereby introducing modelling errors. FIG. 11 shows $\overline{\theta}$ and $\overline{\omega}$ after a transient in which $\overline{\omega}$ is cleared. The stability of the closed loop control system is maintained with the use of the observer, and the behavior of the observer in this situation is consistent with FIGS. 5 and 6 given the presence of large VRM modelling errors.

In all experiments, the rms $\overline{\theta}$ is less than 0.01 $2\pi/M$, which is more than sufficient for the high performance commutation of a VRM. In those experiments with little VRM modelling error, the rms $\overline{\theta}$ is less than 0.0025 $2\pi/M$. Since M=141 in the experimental VRM, the observer can determine rotor position to within 1 part in 50,000 of a mechanical cycle in the absence of VRM modelling errors.

It is emphasized that the present observer operates successfully when $\omega = 0$. The only requirement for this is that at least two phases be excited. Two phases are required since the self inductances through which the observer views rotor position are double valued functions of $\theta$ per electrical cycle. Consequently, measurements from at least two phases are necessary to resolve position modulo an electrical cycle if the VRM is stationary. In contrast, an observer developed for a permanent magnet motor, for example, would not operate successfully at $\omega = 0$ since it viould view position through the mutual inductances between the magnet and the phases. These mutual inductances require time variation to induce a voltage at the terminals of a phase. However, the phases need not be excited for this voltage to be observed.

Several extensions and improvements of the exemplary observer set forth above are contemplated. First, the observer would be applicable in the presence of nonconstant and nonlinear VRM magnetics. Second, (31) can be modified so that dynamic correction is present in (20). Third, the observer can be made adaptive so as to follow variations in R, B, and J. Furthermore, the observer disclosed herein can be modified to work with other motors. The modification of (31) to provide dynamic correction in (20) is an important extension. It is observed experimentally that if (20) with (31) is not reset by the combined action of the VRM control law and inverter at a rate of approximately $RH^{(0)}$, then the present observer performs less well than desired, primarily because of modelling errors in H and R. This extension has been successfully demonstrated in the laboratory.

It is thus seen that the objects of this invention have been achieved in that there has been disclosed a simple state observer for estimating the angular orientation and angular velocity of the rotor of synchronous motors successfully in the presence of large VRM modelling errors. The invention set forth herein thus allows the control of synchronous motors without requiring direct measurement of rotor angular orientation. Equipment such as resolvers and encoders becomes unnecessary resulting in synchronous motors of reduced cost, size and weight and higher reliability. The observer disclosed herein will often require no additional equipment in that the observer model may be implemented with existing motor controllers. It is recognized that modifications and variations of the present invention will occur to those skilled in the art and it is intended that all such modifications and variations be included within the scope of the appended claims.

| APPENDIX | |
|---|---|
| [1] J. R. Frus and B. C. Kuo, 'Closed-loop control of step motors without feedback control', Proceedings of the 5th Incremental Motion Control Systems and Devices Symposium, CC/1–CC/11, Urbana, Illinois, 1976. | [12] S. R. Kou, D. L. Elliot and T. J. Tarn, 'Exponential observers for nonlinear dynamic systems', Information and Control, 29, 204–216, 1975. |
| [2] B. C. Kuo and Cassat, 'On current detection in variable reluctance step motors', Proceedings of the 6th Incremental Motion Control Systems And Devices Symposium, 205–220, Urbana, Illinois, 1977. | [13] D. Bestle and M. Zeitz, 'Canonical form observer for nonlinear time-variable systems', International Journal of Control, 38, 419–431, 1983. |
| [3] A. Pittet and M. Jufer, 'Closed-loop control without encoder of electromagnetic step motors', Proceedings of the 7th Incremental Motion Control Systems And Devices Symposium, 37–44, Urbana, Illinois, 1978. | [14] A. J. Krener and W. Respondek, 'Nonlinear observers with linearizable error dynamics', SIAM Journal of Control and Optimization, 23, 197–216, 1985. |
| [4] P. P. Acarnley, R. J. Hill and C. W. Hooper, 'Detection of rotor position in stepping and switched motors by monitoring of current waveforms', IEEE Transactions on Industrial Electronics, 32, 215–222, 1985. | [15] A. Bellini, G. Figalli and G. Ulivi, 'Realization of a bilineer observer of the induction machine', Proceedings of the Second International Conference on Electrical Variable Speed Drives, 175–178, London, 1979. |
| [5] W. C. Lin, B. C. Kuo and U. Goerke, 'Waveform detection of permanent magnet motors: parts I and II', Proceedings of the 8th Incremental Motion Control Systems And Devices Symposium, 227–256, Urbana, Illinois, 1979. | [16] Y. Dote, 'Stabilization of controlled current induction motor drive system via new nonlinear state observer', IEEE Transactions on Industrial Electronics and Control Instrumentation, 27, 77–81, 1980. |
| [6] B. C. Kuo and K. Butts, 'Closed loop control of a 3.6° floppy disk drive pm motor by back emf sensing', Proceedings of the 11th Incremental Motion Control Systems And Devices Symposium, Urbana, Illinois, 1983. | [17] G. C. Verghese and S. R. Sanders, 'Observers for faster flux estimation in induction machines', Proceedings of the IEEE Power Electronics Specialists Conference, Toulouse, 1985. |
| [7] T. Higuchi, 'Closed loop control of pm step motors by back emf sensing', Proceedings of the 11th Incremental Motion Control Systems And Devices Symposium, Urbana, Illinois, 1982. | [18] H. Kwakernaak and R. Sivan, Linear Optimal Control Systems, John Wiley, 1972. |
| [8] V. D. Hair, 'Direct detection of back emf in permanent-magnet step motors', Proceedings of the 12th Incremental Motion Control Systems and Devices Symposium, 211–219, Urbana, Illinois, 1983. | [19] H. H. Woodson and J. R. Melcher, Electromechanical Dynamics, Volume 1, John Wiley and Sons, 1968. |
| [9] D. G. Luenberger, 'An introduction to observers', IEEE Transactions on Automatic Control, 16, 596–602, 1971. | [20] R. W. Brocket, Finite Dimensional Linear Systems, John Wiley and Sons, 1970. |
| [10] D. G. Luenberger, 'Introduction to Dynamic Systems, John Wiley, 1979. | [21] A. Lumsdaine, 'Control of a Variable Reluctance Motor Based on State Observation', S. M. Thesis, Massachusetts Institute of Technology, Cambridge, MA, November 1985. |
| [11] F. E. Thau, 'Observing the state of nonlinear dynamic systems', International Journal of Control, 17, 471–479, 1973. | | such as variable reluctance motors and permanent magnet motors. In the example described in this disclosure, the observer was based upon the simplifying, yet practical, assumptions of linear VRM magnetics and constant VRM velocity. This observer was driven only by measurements of phase voltages and currents. The exponential stability of observer error has been proven and demonstrated experimentally. The observer determines rotor position to within 1 part in 50,000 of a revolution in the absence of VRM modelling errors and has been successfully used as the basis for closed loop control of a VRM motor. Furthermore, this observer operated

What is claimed is:

1. Controller for a synchronous motor comprising:
   means for measuring motor phase voltages and currents,
   computing means responsive to the motor phase voltages and currents for calculating estimates of rotor angular orientation from observer model equations derived from state equations of the motor and adapted to have stable dynamics, whereby the estimates of rotor angular orientation converge to values of actual rotor angular orientation, and means responsive to said estimates of rotor angular orientation for controlling the motor pulse voltages, whereby motor phases are excited substantially in synchronism with the rotor angular orientation.

2. The controller of claim 1 wherein the motor is a variable reluctance motor.

3. The controller of claim 1 wherein the motor is a permanent magnet motor.

4. The controller of claim 1 wherein the motor is a magnetically linear variable reluctance motor.

5. The controller of claim 1 wherein the motor is a variable reluctance motor and the observer model equations take the form of:

$$\tilde{\lambda}' = -RH(\tilde{\theta})\tilde{\lambda} + \nu + F_\lambda(\tilde{\theta},\tilde{\lambda})(\tilde{i}-i)$$

$$\tilde{\omega}' = F_\omega(\tilde{\theta},\tilde{\lambda})(\tilde{i}-i)$$

$$\tilde{\theta}' = \tilde{\omega} = F_\theta(\tilde{\theta},\tilde{\lambda})(\tilde{i}-i)$$

$$\tilde{i} = H(\tilde{\theta})\tilde{\lambda},$$

wherein $\lambda$, $\nu$, $i$, $R$, and $H$ represent phase flux linkages, voltages, currents, resistances, and reciprocal inductances respectively, $\omega$, $\theta$, $D$, and $J$ represent rotor velocity, angular orientation, damping, and inertia, respectively, tilde denotes an estimate, prime denotes a first derivative, and $F_\lambda$, $F_\omega$, and $F_\theta$ are functions selected to assure stability.

6. Controller for a synchronous motor comprising:

means for detecting motor phase voltages and currents, computing means for calculating estimates of rotor angular orientation from observer model equations of the form:

$$\tilde{\lambda}' = -RH(\tilde{\theta})\tilde{\lambda} + \nu + F_\lambda(\tilde{\theta},\tilde{\lambda})(\tilde{i}-i)$$

$$\tilde{\omega}' = F_\omega(\tilde{\theta},\tilde{\lambda})(\tilde{i}-i)$$

$$\tilde{\theta}' = \tilde{\omega} = F_\theta(\tilde{\theta},\tilde{\lambda})(\tilde{i}-i)$$

$$\tilde{i} = H(\tilde{\theta})\tilde{\lambda},$$

wherein $\lambda$, $\nu$, $i$, $R$, and $H$ represent phase flux linkages, voltages, currents, resistances, and reciprocal inductances respectively, $\omega$, $\theta$, $D$, and $J$ represent rotor velocity, angular orientation, damping, and inertia, respectively, tilde denotes an estimate, prime denotes a first derivative, and $F_\lambda$, $F_\omega$, and $F_\theta$ are functions selected to assure stability, whereby the estimates of rotor angular orientation $\theta$ converge to values of actual rotor angular orientation $\theta$, and means responsive to said estimates of rotor angular orientation for controlling the phase voltages of the motor, whereby the motor phases are excited substantially in synchronism with the rotor angular orientation.

7. The controller of claim 6 wherein the synchronous motor is a variable reluctance motor.

8. The controller of claim 6 wherein $F_\lambda = R$.

9. The controller of claim 6 wherein $G_\omega$ and $G_\theta$ are positive constants wherein $$F_\lambda(\theta,\omega) = R, \; F_\omega(\theta,\lambda) = -G_\omega[1 \ldots 1]\frac{dH(\theta)^*}{d\theta}, \text{ and}$$

$$F_\theta(\theta,\lambda) = -G_\theta[1 \ldots 1]\frac{dH(\theta)^*}{d\theta}.$$

10. Controller for a synchronous motor comprising:

means for measuring motor phase voltages and currents, computing means responsive to the motor phase voltages and currents for calculating estimates of rotor angular velocity from observer model equations derived from state equations of the motor and adapted to have stable dynamics, whereby the estimates of rotor angular velocity converge to values of actual rotor angular velocity, and means responsive to said estimates of rotor angular velocity for controlling the motor phase voltages for synchronous excitation of the motor.

11. Controller for a synchronous motor comprising:

means for measuring motor phase voltages and currents, computing means responsive to the motor phase voltages and currents for calculating estimates of phase flux linkages from observer model equations derived from state equations of the motor and adapted to have stable dynamics, whereby the estimates of phase flux linkages converge to values of actual phase flux linkages, and means responsive to said estimates of phase flux linkages for controlling the motor phase voltages for synchronous excitation of the motor.

12. Controller for a synchronous motor comprising:

means for measuring motor phase voltages and currents, computing means responsive to the motor phase voltages and currents for calculating estimates of motor currents from observer model equations derived from state equations of the motor and adapted to have stable dynamics, whereby the estimates of motor currents converge to values of actual motor currents, and means responsive to said estimates of motor currents for controlling the motor phase voltages for synchronous excitation of the motor.

* * * * *

UNITED STATES PATENT AND TRADEMARK OFFICE
CERTIFICATE OF CORRECTION

PATENT NO. : 5,296,793

DATED : March 22, 1994

INVENTOR(S) : Jeffrey H. Lang

It is certified that error appears in the above-indentified patent and that said Letters Patent is hereby corrected as shown below:

Column 5, line 49: delete "$F_r$" and insert therefor -- $F_\lambda$ --;

Column 7, line 67: delete "$\omega 1.62$" and insert therefor -- $\omega = 1.62$ --;

Column 11, line 2: delete "pulse" and insert therefor -- phase --; and

Column 12, line 9: move "wherein $G_\omega$ and $G_\theta$ are positive constants" to the end of claim 9.

Signed and Sealed this

Twenty-fifth Day of October, 1994

Attest:

BRUCE LEHMAN

Attesting Officer

Commissioner of Patents and Trademarks